United States Patent
Ko et al.

(10) Patent No.: US 6,744,713 B1
(45) Date of Patent: *Jun. 1, 2004

(54) RECORDING MEDIUM FOR STORING WRITE PROTECTION INFORMATION AND WRITE PROTECTION METHOD THEREOF

(75) Inventors: Jung-wan Ko, Yongin (KR); Kyung-geun Lee, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/610,695

(22) Filed: Jul. 5, 2000

Related U.S. Application Data

(62) Division of application No. 09/333,520, filed on Jun. 15, 1999.

(30) Foreign Application Priority Data

| | | |
|---|---|---|
| Jun. 15, 1998 | (KR) | 98-22390 |
| Jun. 24, 1998 | (KR) | 98-23917 |
| Sep. 24, 1998 | (KR) | 98-39727 |
| Dec. 10, 1998 | (KR) | 98-54190 |
| Feb. 10, 1999 | (KR) | 99-4679 |

(51) Int. Cl.$^7$ ............................................. G11B 7/006
(52) U.S. Cl. ................. 369/47.1; 369/30.05; 369/30.09; 369/47.13; 369/53.21
(58) Field of Search ............................. 369/291, 30.09, 369/275.4, 47.12, 53.21, 53.24, 47.13, 47.1, 53.19, 47.14, 30.05; 360/133, 60, 48; 713/176; 386/95, 65, 125

(56) References Cited

U.S. PATENT DOCUMENTS 4,805,061 A  2/1989 Champagne et al. ....... 360/133
5,142,515 A  8/1992 McFerrin et al. ........ 369/30.11
5,233,576 A  8/1993 Curtis et al. ............. 369/13.02

(List continued on next page.)

FOREIGN PATENT DOCUMENTS

| EP | 406 021 A2 | 1/1991 |
| EP | 0 921 526 A1 | 6/1999 |
| JP | 57-053802 | 3/1982 |

(List continued on next page.)

OTHER PUBLICATIONS

Japanese Office Action for Japanese App. No. 2000–319954.
Japanese Office Action for Japanese App. No. 11–167491.
Technical Disclosure Bulletin, "Method for Write–Protecting a Program Disk", vol. 30, No. 10, Mar. 1998.

(List continued on next page.)

*Primary Examiner*—William Korzuch
*Assistant Examiner*—Kim-Kwok Chu
(74) *Attorney, Agent, or Firm*—Staas & Halsey LLP

(57) ABSTRACT

A recording medium storing a write protection information, and a write protection method for protecting data recorded on a recordable and/or rewritable disc from unwanted overwriting or erasing. In order for write protection of a disc in a bare state that is usually used in a cartridge having a recognition switch for write-protection, such as a DVD-RAM, write protection information is recorded in a Lead-in area, a Lead-out area or a recording information area other than a user data area of the disc, and the data is protected from unwanted overwriting or erasing using the write protection information. Also, even though the write protection information stored on a disc does not match the state of a recognition switch of a case for write-protection, the data can be prevented from unwanted overwriting or erasing. Thus, the write protection can be ensured when a recordable and/or rewritable recording medium, such as DVD-RAM, DVD-R and DVD-RW, is used in a bare state.

40 Claims, 13 Drawing Sheets

| b7 | b6 | b5 | b4 | b3 | b2 | b1 | b0 |
|---|---|---|---|---|---|---|---|
| In Process | | | Disc write protection | | Reserved | User certification | Disc manufacturer certification |

| b7 | b6 | b5 | b4 | b3 | b2 | b1 | b0 |
|---|---|---|---|---|---|---|---|
| In Process | | Reserved | Group write protection | | Reserved | User certification | Reserved |

U.S. PATENT DOCUMENTS

| | | | |
|---|---|---|---|
| 5,315,578 A | 5/1994 | Furukawa | 369/275.3 |
| 5,404,357 A | 4/1995 | Ito et al. | 714/719 |
| 5,420,838 A * | 5/1995 | Maeda et al. | 369/30.09 |
| 5,535,188 A | 7/1996 | Dang et al. | 369/53.21 |
| 5,617,393 A | 4/1997 | Itami et al. | 369/53.21 |
| 5,654,950 A | 8/1997 | Itoh | 369/47.12 |
| 5,694,381 A | 12/1997 | Sako | 369/47.12 |
| 5,737,290 A * | 4/1998 | Ohmori | 369/53.21 |
| 5,757,764 A * | 5/1998 | Tanaka | 369/291 |
| 5,761,301 A | 6/1998 | Oshima et al. | 705/57 |
| 5,905,709 A * | 5/1999 | Blaukovitsch | 369/275.4 |
| 6,034,931 A | 3/2000 | Miwa et al. | 369/47.12 |
| 6,072,759 A | 6/2000 | Maeda et al. | 369/59.25 |
| 6,078,727 A * | 6/2000 | Saeki et al. | 386/125 |
| 6,088,507 A * | 7/2000 | Yamauchi et al. | 386/95 |
| 6,141,702 A | 10/2000 | Ludtke et al. | 710/5 |
| 6,243,340 B1 * | 6/2001 | Ito et al. | 369/53.19 |
| 6,288,989 B1 * | 9/2001 | Ro et al. | 369/47.13 |
| 6,289,423 B1 | 9/2001 | Ozaki et al. | 711/163 |
| 6,343,180 B1 * | 1/2002 | Kim | 386/65 |
| 6,385,389 B1 * | 5/2002 | Maruyama et al. | 386/95 |
| 6,490,683 B1 * | 12/2002 | Yamada et al. | 713/716 |

FOREIGN PATENT DOCUMENTS

| | | |
|---|---|---|
| JP | 62-298058 | 12/1987 |
| JP | 63-237259 | 10/1988 |
| JP | 2-301072 | 12/1990 |
| JP | 3-35476 | 2/1991 |
| JP | 3-203815 | 9/1991 |
| JP | 03-278374 | 12/1991 |
| JP | 03-286448 | 12/1991 |
| JP | 4-168630 | 6/1992 |
| JP | 4-178968 | 6/1992 |
| JP | 5-198095 | 8/1993 |
| JP | 06-197306 | 7/1994 |
| JP | 07-006567 | 1/1995 |
| JP | 8-336668 | 12/1996 |
| JP | 9-50373 | 2/1997 |
| JP | 09-120626 | 5/1997 |
| JP | 9-120626 | 5/1997 |
| JP | 09-305969 | 11/1997 |
| WO | WO 96/28820 | 9/1996 |
| WO | WO97/13365 | 4/1997 |
| WO | WO97/35309 | 9/1997 |
| WO | WO98/24027 | 6/1998 |

OTHER PUBLICATIONS

Patent Abstracts of Japan—JP 8–315361, Nov. 29, 1996.
Patent Abstracts of Japan—JP 11–045545, Feb. 16, 1999.
Patent Abstracts of Japan—JP 09–231018, Sep. 5, 1997.
U.S. patent application Ser. No. 09/333,520, Ko et al., filed Jun. 15, 1999.
U.S. patent application Ser. No. 09/610,381, Ko et al., filed Jul. 5, 2000.
U.S. patent application Ser. No. 10/020,074, Ko et al., filed Dec. 19, 2001.
U.S. patent application Ser. No. 10/020,980, Ko et al., filed Dec. 19, 2001.
U.S. patent application Ser. No. 10/020,945, Ko et al., filed Dec. 19, 2001.
U.S. patent application Ser. No. 10/107,147, Ko et al., filed Mar. 28, 2002.

* cited by examiner

FIG. 3A  PRIOR ART

| b7 | b6 | b5 | b4 | b3 | b2 | b1 | b0 |
|---|---|---|---|---|---|---|---|
| In Process | | | Reserved | | | User certification | Disc manufacturer certification |

FIG. 3B  PRIOR ART

| b7 | b6 | b5 | b4 | b3 | b2 | b1 | b0 |
|---|---|---|---|---|---|---|---|
| In Process | | | Reserved | | | User certification | Reserved |

FIG. 4A

| b7 | b6 | b5 | b4 | b3 | b2 | b1 | b0 |
|---|---|---|---|---|---|---|---|
| In Process | | | Disc write protection | | Reserved | User certification | Disc manufacturer certification |

FIG. 4B

| b7 | b6 | b5 | b4 | b3 | b2 | b1 | b0 |
|---|---|---|---|---|---|---|---|
| In Process | | Reserved | Group write protection | | Reserved | User certification | Reserved |

FIG. 5A

| b7 | b6 | b5 | b4 | b3 | b2 | b1 | b0 |
|---|---|---|---|---|---|---|---|
| In Process | | | Disc write protection | Reserved | | User certification | Disc manufacturer Certification |

FIG. 5B

| b7 | b6 | b5 | b4 | b3 | b2 | b1 | b0 |
|---|---|---|---|---|---|---|---|
| In Process | | Reserved | Group write protection | Reserved | | User certification | Reserved |

FIG. 13
PRIOR ART

| Sector # | RMD Field | DVD-R(Ver 1.9) | DVD-RW |
|---|---|---|---|
| 0 | | Linking-loss area | |
| 1 | 0 | General information of disc | |
| 2 | 1 | OPC related information | |
| 3 | 2 | User specific data | |
| 4 | 3 | Border zone information | |
| 5 | 4 | Rzone information | RZone information |
| 6 | 5 | Rzone information | |
| 7 | 6 | Rzone information | |
| 8 | 7 | Rzone information | Defect management & certification related information |
| 9 | 8 | Rzone information | Defect management & certification related information |
| 10 | 9 | Rzone information | Defect management & certification related information |
| 11 | 10 | Rzone information | Defect management & certification related information |
| 12 | 11 | Rzone information | Defect management & certification related information |
| 13 | 12 | Rzone information | Defect management & certification related information |
| 14 | 13 | Reserved | |
| 15 | 14 | Reserved | |

FIG. 14
PRIOR ART

| BP | Contents | Number of bytes |
|---|---|---|
| 0,1 | RMD format | 2 |
| 2 | Disc status | 1 |
| 3 | Reserved | 1 |
| 4 to 21 | Unique disc identifier | 18 |
| 22 to 85 | Copy of Pre-pit Information | 64 |
| 86 to 2047 | Reserved | 1962 |

FIG. 15

| BP | Contents | Number of bytes |
|---|---|---|
| 0,1 | RMD format | 2 |
| 2 | Disc status | 1 |
| 3 | Write protection flag | 1 |
| 4 to 21 | Unique disc identifier | 18 |
| 22 to 85 | Copy of Pre-pit Information | 64 |
| 86 to 2047 | Reserved | 1962 |

RECORDING MEDIUM FOR STORING WRITE PROTECTION INFORMATION AND WRITE PROTECTION METHOD THEREOF

CROSS-REFERENCE TO RELATED APPLICATIONS

This application is a divisional of application Ser. No. 09/333,520, filed Jun. 15, 1999, now pending.

This application claims the benefit of Korean Application Nos. 98-22390, filed Jun. 15, 1998; 98-23917, filed Jun. 24, 1998; 98-39727, filed Sep. 24, 1998; 98-54190, filed Dec. 10, 1998; and 99-4679, filed Feb. 10, 1999, in the Korean Patent Office, the disclosure of which is incorporated herein by reference.

BACKGROUND OF THE INVENTION

1. Field of the Invention

The present invention relates to optical recording and/or reproduction for recording digital data on a disc and/or reproducing the data therefrom, and more particularly, to a write protection method for protecting data recorded by a user on a write-once or rewritable medium from unwanted overwriting or erasing, and a recording medium for storing the write protection information.

2. Description of the Related Art

A DVD-R (Digital Versatile Disc-Recordable) standard and a WORM (Write Once Read Many) standard are standards for a write-once disc, and a DVD-RAM (Digital Versatile Disc Random Access Memory) standard and a DVD-RW (Digital Versatile Disc-Rewritable) standard are standards for a rewritable disc.

According to the DVD-RAM standards published in July of 1997, *DVD Specifications for Rewritable Disc, Part 1 Physical Specifications Version 1.0*, a DVD-RAM adopts a cartridge containing a disc, and discs from Type 2 and Type 3 cartridges can be used, after removal from the cartridge, as bare discs.

Three types of cartridges for a DVD-RAM are defined as follows. In the Type 1 cartridge, a single sided disc or double sided disc is installed in the cartridge and the installed disc can not be taken out of the case. In the Type 2 cartridge, a single sided disc is installed and the installed disc can be taken out of the case. However, when the disc is taken out of the case once, a sensor hole capable of sensing the removal of the disc is permanently changed into an open state, so that the sensor hole cannot be changed into a closed state again. Thus, it can be determined whether or not the disc has been taken out of the case. Also, in the Type 3 cartridge, a sensor hole capable of determining whether or not a disc has been taken out of the case is open in response to the disc being taken out of the case, so the disc can be taken out of or put into the case without restrictions.

Also, in each of Types 1 through 3, the cartridge has a write-inhibit hole (alternatively called "recognition switch for write protection") and according to the standard at page PH-69, writing is possible when the write-inhibit hole is closed and is impossible when the write-inhibit hole is open. That is, when a user intends to protect data written by the user from unwanted overwriting or erasing, the corresponding write-inhibit hole in a closed state is changed into an open state, such that a recording apparatus cannot record to the disc of the corresponding cartridge.

However, in the instance of using the Type 2 or Type 3 cartridge, a bare disc can be used without the case as described above. This is so the disc can be used in a thin recording/reproducing apparatus such as a laptop computer which cannot adopt a cartridge. However, the above specifications do not define any write-protect means other than the write-inhibit hole attached to the case of the cartridge.

For example, when a user, after removing a disc installed in a case that protects from writing, inserts the disc into to a thin recording/reproducing apparatus that cannot accept a cartridge, the write protection by the write-inhibit hole is no longer effective.

Also, there are many DVD related specifications such as a DVD-ROM specification (DVD specification for Read Only Memory), and a DVD-R specification (DVD specification for Recordable Disc). Also, many specifications for rewritable DVD, which are not established yet, can be considered, e.g., a DVD specification for a rewritable and readable disc, which is very similar to the DVD-R specification, and a DVD specification for a disc with enhanced density. Such a series of specifications with the prefix of DVD are called the "DVD family."

Also, a computer operating system adopts various attributes, e.g., read-only and write protection, which is capable of preventing an arbitrary change in written data using attributes of a file that stores the data. However, when a disc is managed at a level lower than that of a file system for managing the file, for example, when the recording and reproduction are directly performed, not via the file system, when the disc is initialized, where the entire file system may not be referred, or in the case that attributes of each file cannot be considered, such a method is not a perfect protection method. A method of protecting data of a bare DVD-RAM from unwanted overwriting or erasing has not yet been introduced.

In the case of a DVD-RAM, a disc can be used in a bare state as well as with the case on. However, in the instance of a DVD-R or a DVD-RW, a disc in a case cannot be used, so that the need to protect the bare disc from unwanted overwriting or erasing has increased. However, when a bare disc taken out of a case is used, it is not possible to utilize the write-inhibit hole, so the write protection must be provided on the disc itself.

In the DVD-R specification, a 3.95 GB specification (Version 1.0) and a 4.7 GB specification (final draft, Version 1.9) do not mention a write protection method for a bare disc. Meanwhile, DVD-RW specifications are being prepared based on the DVD-R specification, and particularly, Version 1.9 defines the use of a bare disc without a case. However, if a future specification defines the use of a disc in a case (for example, extension of application), there will be no write protection method to be applied to a bare disc since the conventional write protection method, which has been applied to a DVD-RAM using the write-inhibit hole, is used.

Further, if the DVD-RW specification allows the use of a case, writing can be prevented using a write-inhibit hole as in the DVD-RAM. However, if a user forgets to change the write-inhibit hole into a write-inhibit position, unwanted erasing or overwriting of data can occur.

SUMMARY OF THE INVENTION

It is an object of the present invention to provide a recording medium in which write protection information is stored on a disc contained in a case.

It is another object of the present invention to provide a recording medium in which write protection information capable of protecting a bare disc from unwanted overwriting or erasing is stored on the disc, when the bare disc has been taken out of a case.

It is still another object of the present invention to provide a write protection method for a recording and/or reproducing apparatus, capable of protecting information written on a recordable and/or rewritable medium from being undesirably overwritten or erased.

To achieve the first and second objects of the present invention, there is provided a recordable and/or rewritable recording medium which may be contained in a case of a cartridge or may be in a bare state, wherein the recording medium stores write protection information capable of protecting the data recorded on the recording medium from unwanted overwriting or erasing.

To achieve the third object of the present invention, there is provided a write protection method for an optical disc recording and/or reproducing apparatus, wherein data recorded on a recordable or reproducible recording medium including a Lead-in area, a Lead-out area and a user data area is protected from unwanted overwriting or erasing, the method comprising the steps of: (a) checking write-protection information stored on the recording medium; and (b) prohibiting writing of data on the recording medium according to the write protection information.

BRIEF DESCRIPTION OF THE DRAWINGS

The above objects and advantages of the present invention will become more apparent by describing in detail preferred embodiments thereof with reference to the attached drawings in which:

FIGS. 3A and 3B show the data structure of a defect management area (DMA) of a general DVD-RAM;

FIGS. 4A and 4B show examples of the data structure of the DMA of a DVD-RAM, for storing write protection information, according to an aspect of the present invention;

FIGS. 5A and 5B show further examples of the data structure of the DMA of a DVD-RAM, for storing write protection information, according to an aspect of the present invention;

FIG. 13 shows the contents of an RMD (Recording Management data) field of an RMA (Recording Management Area) according to the DVD-R and DVD-RW specifications;

FIG. 14 shows the contents of the conventional RMD field 0 shown in FIG. 13;

FIG. 15 shows the contents of the RMD field 0 for storing the write protection information according to the present invention.

DESCRIPTION OF THE PREFERRED EMBODIMENTS

Figure 1:
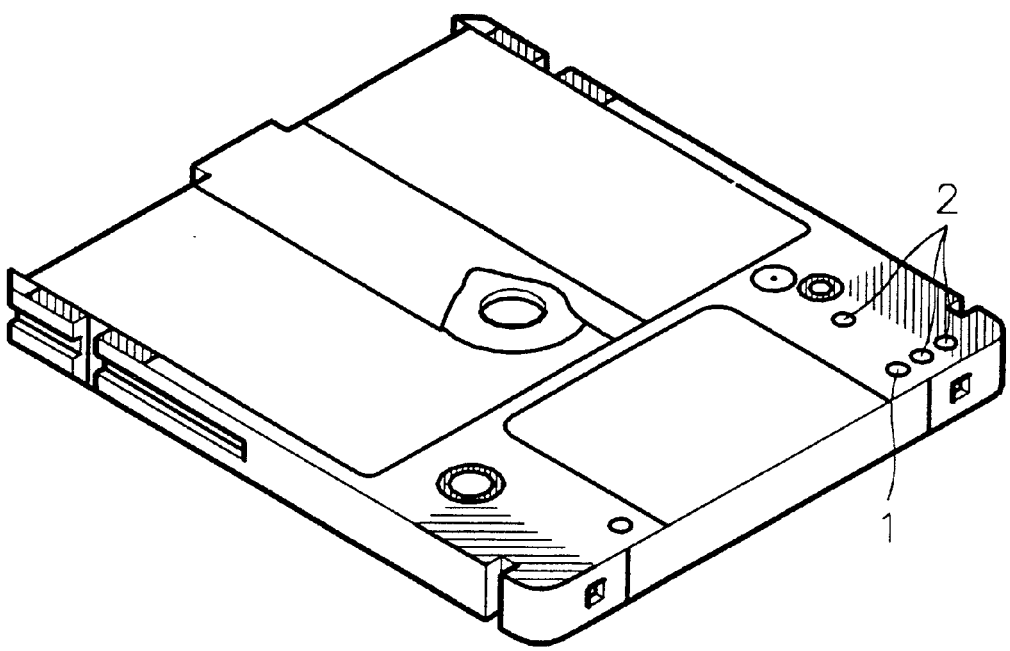
FIG. 1 is a perspective view of a cartridge for a DVD-RAM (Digital Versatile Disc Random Access Memory), having a write-inhibit hole.

Referring to FIG. 1, where the write-inhibit hole of a cartridge according to the DVD-RAM specification is shown, reference numeral 1 represents a write-inhibit hole and a reference numeral 2 represents a sensor hole used to determine whether a disc has been taken out of a case. According to the DVD specifications for rewritable Disc/Part I Physical Specifications Version 1.9, the sensor holes A1, A2 and A3 should be on side B of the case, and corresponding sensor holes B1, B2 and B3 should be on side A of the case. When A1 is closed, the disk has never been removed from the case. When A1 is open, the disk has been removed from the case at least once. When A2 is closed, it represents the active side, and when A2 is open, it represents the non-active side. A3 is reserved.

In FIG. 1, a closed write-inhibit hole 1 indicates that writing is allowed, and an open write-inhibit hole 1 indicates that writing is prohibited. Thus, when the write-inhibit hole 1 is opened, in the corresponding DVD-RAM recording/reproducing apparatus, writing of data to a disc is prohibited even if a write command is input from the outside, so that information written on the disc can be protected from unwanted overwriting.

Figure 2:
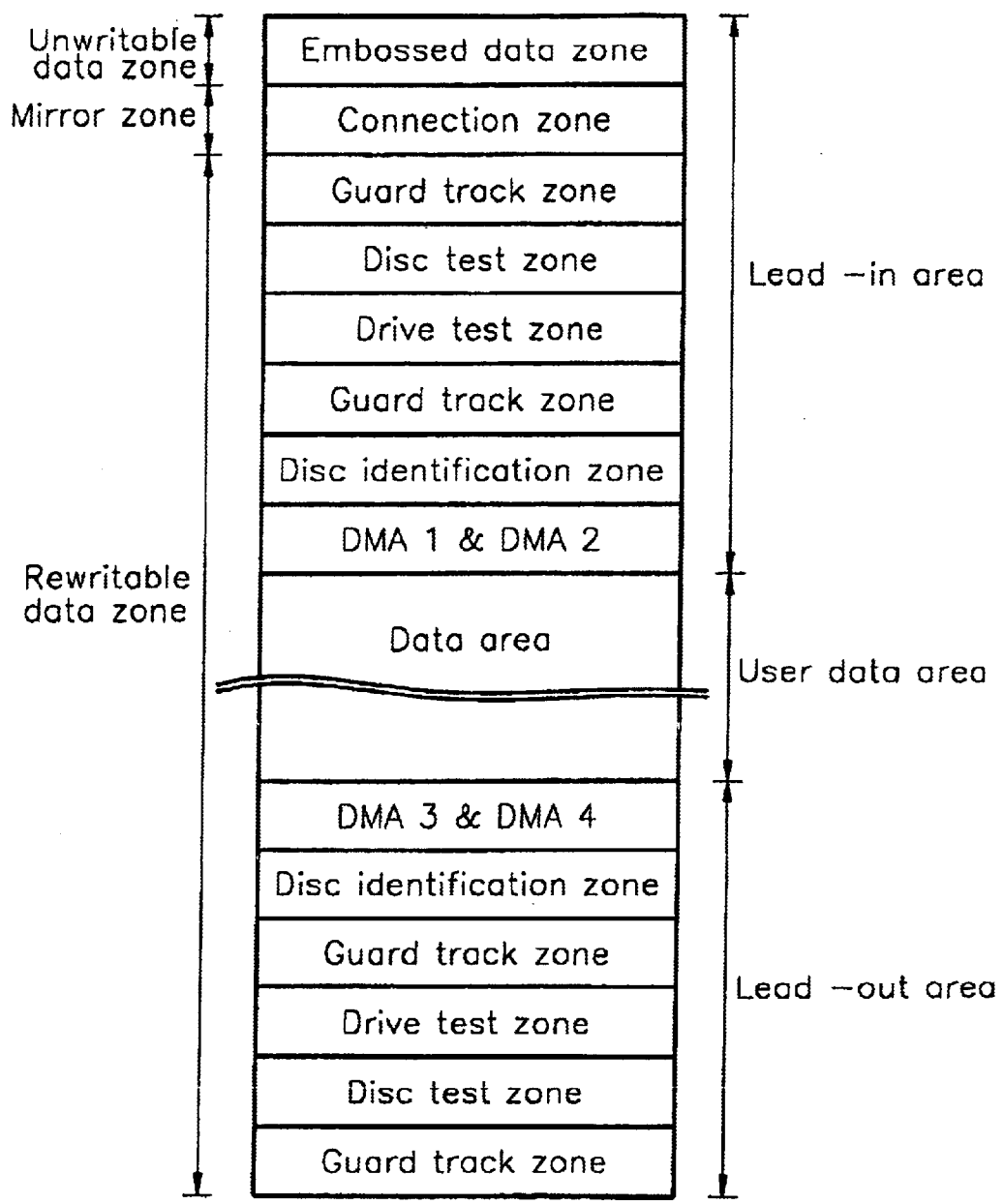
FIG. 2 shows the structure of a general DVD-RAM.

FIG. 2 shows the structure of a disc according to the DVD-RAM specification. The disc comprises three parts, i.e., a Lead-in area, a user data area and a Lead-out area, according to the aspect of function. Also, the disc can be classified into a rewritable area, an unwritable area and a mirror area distinct from the rewritable area and the unwritable area. In particular, the Lead-in area contains a read-only zone in the innermost part, which is an unwritable embossed data zone having pits, and a rewritable data zone following the read only zone, in which both recording and playback are possible. Meanwhile, the Lead-out area and the user data area are only formed of the rewritable data zone. The read-only zone of the Lead-in area contains information about physical specifications of the disc. The rewritable data zone of each of the Lead-in area and the Lead-out area contain two defect management areas DMA 1, DMA 2 or DMA 3 and DMA 4 in which information about disc defects is written, a disc test zone for use by a disc manufacturer in checking the status of the disc, a drive test zone for testing recording and reproduction operations in a recording/reproducing apparatus, a guard track zone for connecting each zone, and a disc identification zone.

In the DVD-RAM specification version 1.0, the purpose for the disc identification zone and the content thereof are not yet clearly described.

FIGS. 3A and 3B show the data structure in each defect management area (DMA) described at pages PH-155 through PH-158 of the DVD-RAM specification, and in particular, they show the data structure of a disc certification flag and a group certification flag respectively, in a disc definition structure (DDS) area of the DMA.

A total of four defect management areas DMA 1, DMA 2, DMA 3 and DMA 4 are present in the Lead-in area and the Lead-out area of a disc, wherein DMA 1 and DMA 2 exist in the Lead-in area and DMA 3 and DMA 4 exist in the Lead-out area, and identical information relating to disc defects and initialization of the disc is stored in each area. Writing such identical information in different areas, i.e., in two areas DMA 1 and DMA 2 of the Lead-in area and in two areas DMA 3 and DMA 4 in the Lead-out area, is done to prevent the problem of data becoming unusable due to disc defects.

In the byte position 3, i.e., BP3, of the disc definition structure (DDS), a disc certification flag as shown in FIG. 3A is present, and the disc certification flag comprises "In Process" information indicating the initialization state of the disc, a "User certification" flag indicating whether the disc is certified by a user, and a "Disc manufacturer certification" flag indicating whether the corresponding disc is certified by a disc manufacturer, and flag information written in the byte position BP3 is information about the entire disc.

Also, in the byte positions 16 to 39, BP16~BP39, each byte has a group certification flag as shown in FIG. 3B in an identical configuration. The byte positions BP16~BP39 have initialization information about 24 recordable areas, i.e., a group, defined in the DVD-RAM specification version 1.0. That is, each group certification flag has "In Process" information indicating the initialization state of the corresponding group and a "User certification" flag indicating whether the disc is certified by a user. Here, the group refers to specific recordable areas of the disc.

FIGS. 4A and 4B are examples of the data structures of a disc certification flag and a group certification flag of the disc definition structure (DDS) area of the defect management area (DMA) that stores write protection information according to the present invention. In the data structure of the disc certification flag shown in FIG. 4A, "Disc write protection" information is stored in bits b4 and b3 of a reserved disc certification flag "Reserved", in contrast to the data structure of the disc certification flag shown in FIG. 3A, and is defined as follows.

| | Disc write protection |
|---|---|
| b4, b3 = 00b: | Disc is not write protected |
| 10b: | Disc is write protected |
| | Entire disc shall not be written to except for drive test zone, and DMA area |
| 11b: | Disc is write protected |
| | Entire disc shall not be written to |
| | These bits shall not be modified to other values |
| Others: | Reserved |

In the same manner, the data structure of the group certification flag shown in FIG. 4B stores "Group write protection" information in bits b4 and b3 of a reserved group certification flag "Reserved", in contrast to the data structure of the group certification flag shown in FIG. 3B, and is defined as follows.

| | Group write protection |
|---|---|
| b4, b3 = 00b: | Group is not write protected |
| 10b: | Group is write protected. User data shall not be written to this block |
| Others: | Reserved |

The states of the bits b4 and b3 of the disc certification flag, and those of the bit b4 and b3 of the group certification flag are shown in Table 1.

TABLE 1

| disc certification flag | | group certification flag | | |
|---|---|---|---|---|
| b4 | b3 | b4 | b3 | states |
| 0 | 0 | 0 | 0 | No write protection |
| 0 | 0 | 1 | 0 | Given group is write protected |
| 1 | 0 | Don't care | | Soft write protected on entire disc |
| 1 | 1 | | | Hard write protected on entire disc |

In the above Table 1, soft write protection means that write protection can be released, that is, that the write protection state can be changed to a rewritable state by setting the corresponding bit b4 to "0". Also, hard write protection means that write protection is applied to the Lead-out area as well as to the Lead-in area, so that the write protection state can not be restored to the rewritable state.

In the hard write protection for the group, making a part of the disc hard write-protected does not provide advantages to a user in use, rather than in a technical aspect, and particularly, there is a problem of processing in the corresponding group when the entire disc is reinitialized. Thus, it is unfavorable to set the hard write protection for the group.

As shown in the data structure of FIGS. 4A and 4B, the write protection information of the disc is written in the disc definition structure (DDS) of the defect management area (DMA), and identical write protection information is written four times to the same disc, so that robustness of the write protection information on the disc is enhanced.

When a bare disc that is write protected is inserted for use into a case, the write-inhibit hole of which is in a rewritable state, or if a bare disc that is not write protected is inserted into a case, the write-inhibit hole of which is in a write protection state, the write inhibition information stored on the disc cannot match the state of the write-inhibit hole of the case.

In such a case, if either one of the disc or the case is write protected, it is preferable to operate to be suitable for the write protection state. This is because in the user's position it is preferable that the content of data be checked again without overwriting rather than important data being damaged or erased through overwriting.

FIGS. 5A and 5B are further examples of the data structures of the disc certification flag and the group certification flag, respectively, of the disc definition structure (DDS) area of the defect management area (DMA) that stores the write protection information according to the present invention.

In the case where the write protection information is in the disc certification flag shown in FIG. 5A, it is possible that only one bit b4 be used regardless of whether the write protection information is for the hard write protection or for the soft write protection, which is defined as follows.

| | Disc write protection |
|---|---|
| b4 = 0b: | Disc is not write protected |
| 1b: | Disc is write protected |
| | Entire disc shall not be written to except for drive test zone, and DMA area |

The group test flag shown in FIG. 5B can store the write protection information using only one bit b4, which is defined as follows.

|  |  | Group write protection |
| --- | --- | --- |
| b4 = | 0b: | Group is not write protected |
|  | 1b: | Group is write protected |
|  |  | User data shall not be written to this block |

In this case, preferably bit b4 of the disc certification flag and the bit b4 of the group certification flag are used. However, instead of using the bit b4 of the disc certification flag or group certification flag, any "Reserved" bits can be used.

Also, the bit b4 of the group certification flag, that is, "Group write protection" flag, may not be used. This is effective in a disc in which only a specific group is not write protected, and in this case the bit b4 of the group certification flag is "Reserved" as in the conventional specifications, like as shown in FIG. 3B.

The present invention can be applied to a case without a write-inhibit hole, and information on the disc can be efficiently protected in this case using the write protection information stored on the disc.

Figure 6A:
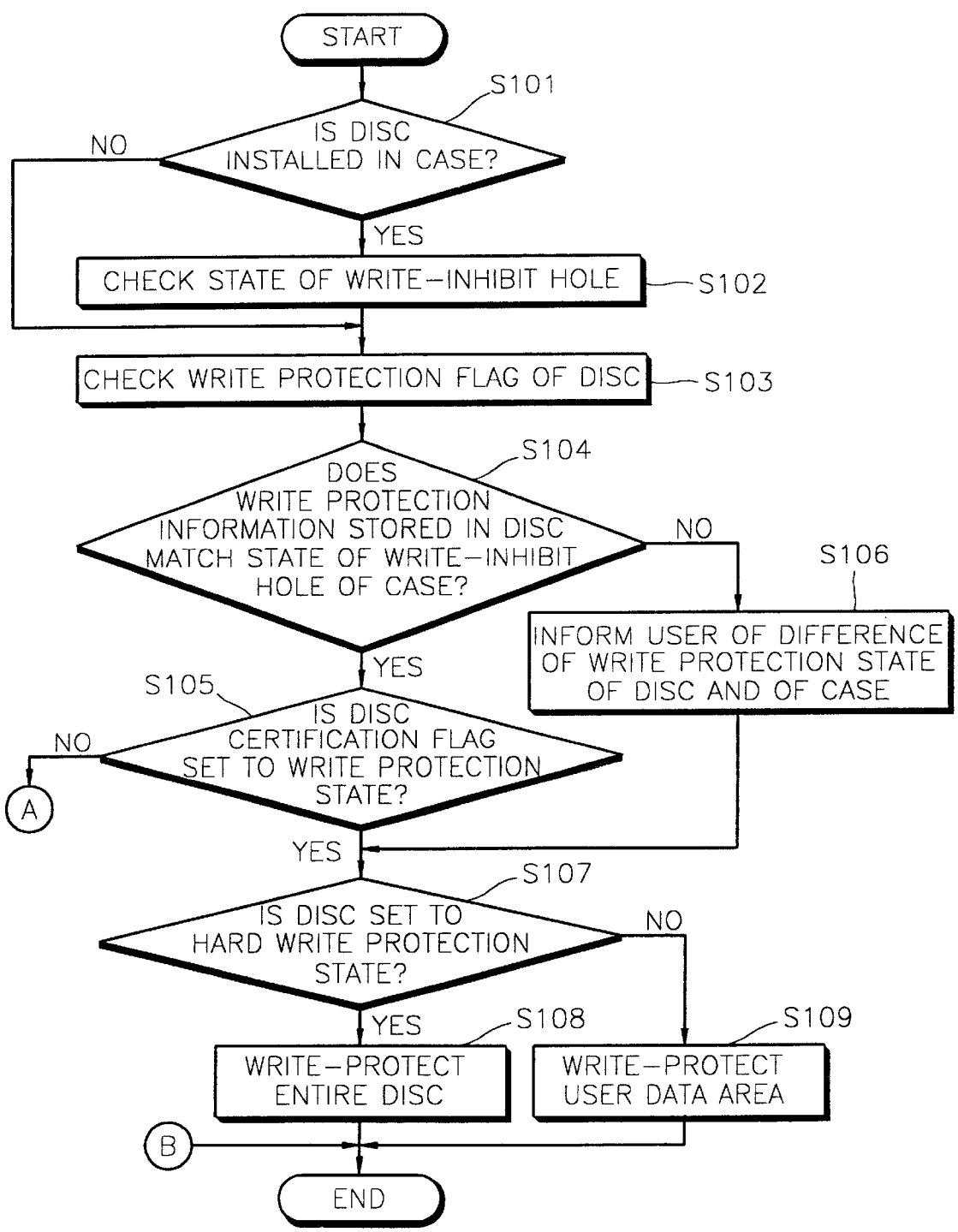
FIGS. 6A and 6B are flowcharts illustrating a write protection method according to a first embodiment of the present invention.
Figure 6B:
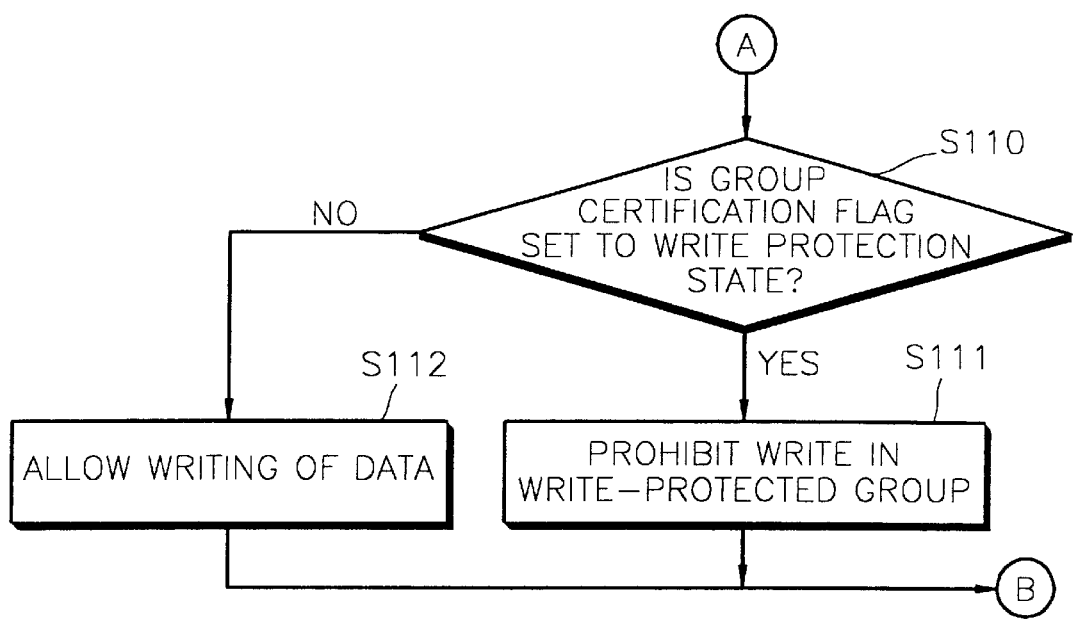

FIGS. 6A and 6B are flowcharts illustrating a write-protection method according to a first embodiment of the present invention. First, it is checked whether a disc is installed in a case (step S101), and if the disc is installed in the case, the state of the write-inhibit hole of the case is checked (step S102). That is, when the write-inhibit hole is closed, it means that cartridge is not write protected. When the write-inhibit hole is open, it means that the cartridge is write protected.

If it is determined in step S101 that the disc is not installed in the case, or after the state of the write-inhibit hole is checked in step S102, a write protection flag of the disc is checked (step S103). That is, write protection flags within the disc certification flag and the group certification flag of the DDS in each DMA are checked.

It is determined whether the write protection information of the disc matches the state of the write-inhibit hole of the case (step S104). That is, when write protection information is written on the disc and the write-inhibit hole of the case is open, it is determined whether the write protection flag of the disc certification flag is set to a "write protection" state (step S105). Otherwise, a user is informed of that the write protection information of the disc does not match the state of the write-inhibit hole of the case (step S106).

If the write protection flag of the disc certification flag is set as a write protection state in the step S105, or if one of either the disc or the case indicates the write protection state even though both the write-protection states of the disc and the case do not match in the step S106, it is checked whether the disc is set to a "hard write protection" state (step S107). If the disc is set to the "hard write protection" state, data writing to the entire disc including the Lead-in area and the Lead-out area in addition to the user data area is prohibited (step S108). Otherwise, data writing in the user data area, and except for the drive test zone and the defect management area (DMA), is prohibited (step S109).

If it is determined in the step S105 that the write protection flag of the disc certification flag is not set to the "writing protection" state, it is checked whether the write protection flag of the group certification flag is set to the "write protection" state (step S110). If the write protection flag of the group certification flag is set to a "write protection" state, writing data in the corresponding group is prohibited (step S111). Otherwise, data writing is allowed in the rewritable area (step S112).

The write protection method illustrated in FIGS. 6A and 6B corresponds to the case of using the disc certification flag containing the hard write protection flag shown in FIG. 4A, and the group certification flag shown in FIG. 4B. When the disc certification flag of FIG. 5A and the group certification flag of FIG. 5B are used, the steps S107 and S108 illustrated with reference to FIGS. 6A are not performed. When the disc certification flag is set to the "write protection" state in the step S105, writing data in the user data area is prohibited in step S109.

Figure 7:
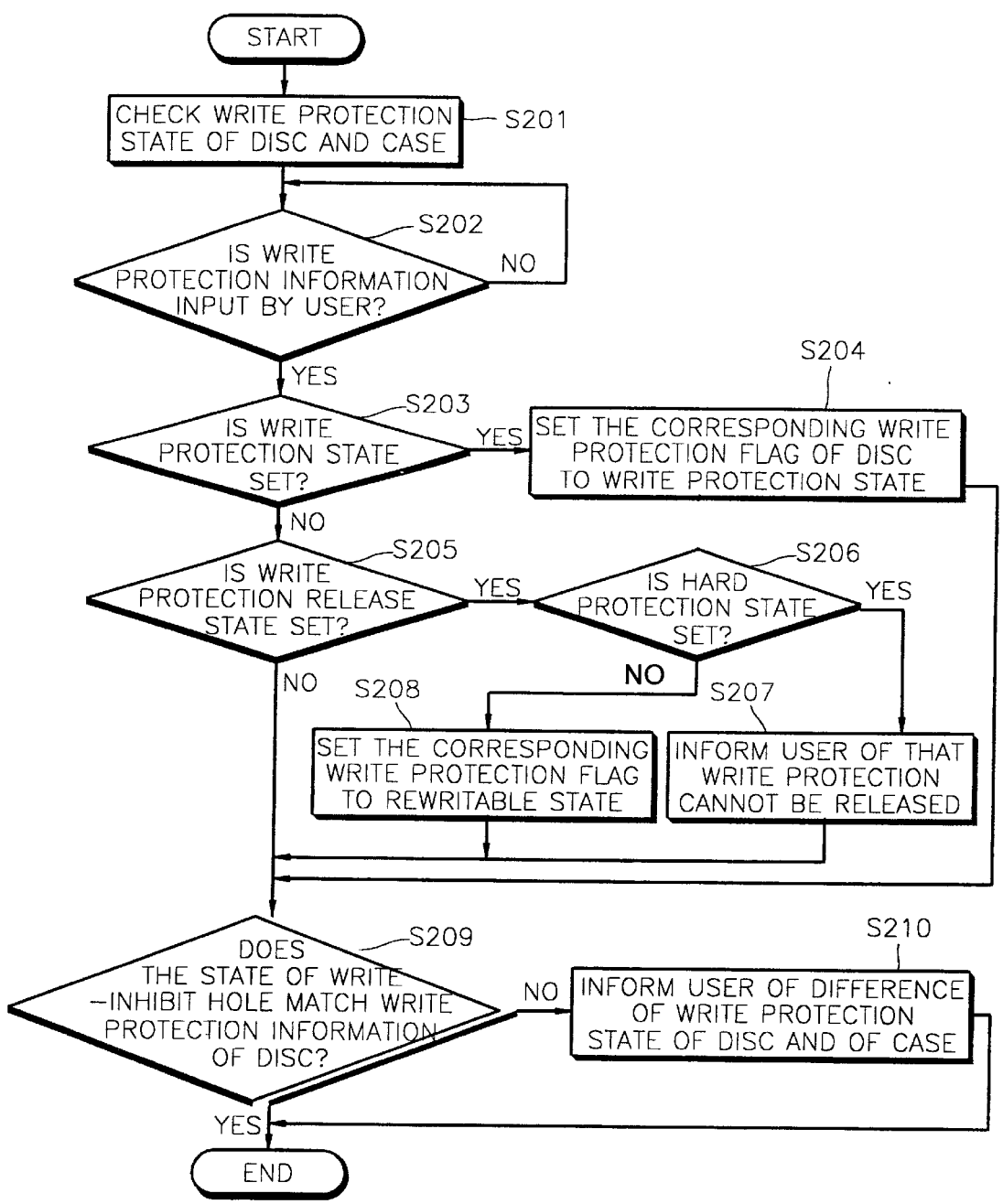
FIG. 7 is a flowchart illustrating a method of updating write protection information according to the present invention.

FIG. 7 is a flowchart illustrating a method of setting a rewritable disc to the write protection state or of changing the write protection state of the disc to a rewritable state. A method of updating the write protection information will now be described with reference to the flowchart of FIG. 7.

In FIG. 7, when a disc or a cartridge is inserted into a recording/reproducing apparatus, the write protection information is checked (step S201). Then, it is determined whether the write protection information has been input by a user (step S202) and when the write protection information is input by the user, it is determined whether information set by the user is for write protection (step S203). If the information set by the user is write protection information, the corresponding write protection flag of the disc is set to the write protection state (step S204).

When the information set by the user is not write protection information in step S203, it is determined whether the information set by the user is write protection release information (step S205). If the information set by the user is the write protection release information, it is determined whether the current disc is in a hard write protection state (step S206). If the current disc is in the hard write protection state, the user is informed that write protection cannot be released (step S207). If it is determined in step S206 that the disc is not in the hard write protection state, the corresponding write protection flag of the disc is set to the rewritable state (step S208).

Also, when the setting of the write protection or the release of the write protection of the disc is completed, that is, the step S204, S207 or S208 is completed, and the disc is installed in a case, it is determined in step S209 whether the state of the write-inhibit hole of the case matches the write protection information stored in the disc. If the state of the write-inhibit hole of the case does not match the state of the disc, the user is informed of such difference (step S210), and then the procedure is completed.

The method of updating the write-protection information, illustrated in FIG. 7, can be performed when a bare disc is inserted or a disc in a case is inserted, and can be performed after the write-protection is controlled using the write protection information as illustrated with reference to FIGS. 6A and 6B.

In the preferred embodiment of the present invention, the write protection information of the disc is written in the defect management area of the disc. However, the disc identification zone of FIG. 2 can be used instead of the defect management area of the disc. The disc identification zone is present both in the Lead-in area and the Lead-out area, like the defect management area of the disc. Thus, writing identical information two or more times to the disc identification zones located in the Lead-in area and the Lead-out area can ensure robustness as strong as in the defect management areas of the disc.

Since the disc identification zone is not presently used for a specific purpose, there is an advantage that the disc identification zone does not conflict with the information written in the defect management area of the disc. In particular, information of the defect information area relates to only the DVD-RAM, it is difficult to maintain consistency between discs for optical recording/reproduction. Meanwhile, since the disc identification zone is not restricted to a specific disc, the disc identification zone can maintain consistency with another disc satisfying the similar specifications.

An example of storing the write protection information using the disc identification zone will be described with reference to FIGS. 8 and 9.

Figure 8:
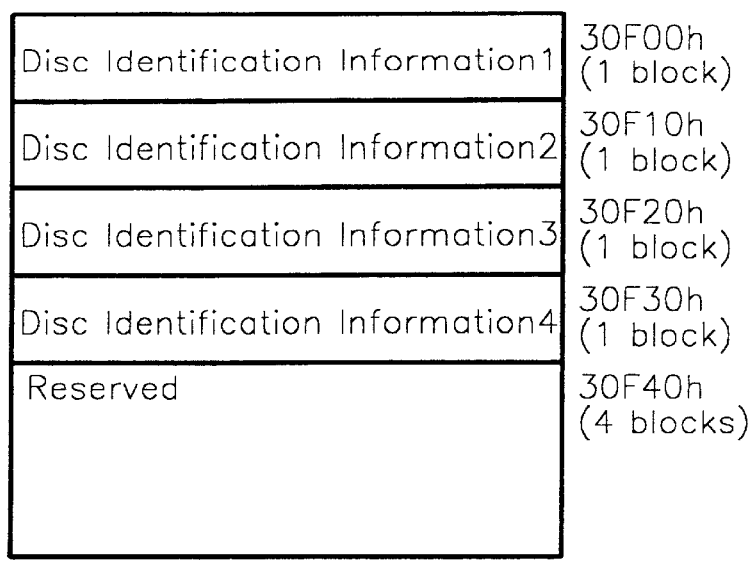
FIG. 8 shows the structure of a disc identification zone for storing the write protection information according to the present invention.

As shown in FIG. 8, in the structure of a disc identification zone that stores write protection information for a bare disc, four flags for write protection are concurrently written to the disc identification zone, and two or more normal flags of the four flags are read. If the contents of the read flags matches each other, it is regarded that the write protection is set for the disc.

For example, the four flags are written in only the disc identification zone of the Lead-in area, and disc identification information of 1 block length (=1 byte) is successively written four times in the four blocks from the start of the disc identification zone of the Lead-in area, and all the first bytes of disc identification information contain a write protection flag. The disc identification information of 1 block length is summarized as shown in Table 2.

TABLE 2

| BP | Contents | Number of bytes |
| --- | --- | --- |
| 0 | Write protection information | 1 byte |
| 1 to 32767 | Reserved | 32767 bytes |

Figure 9:
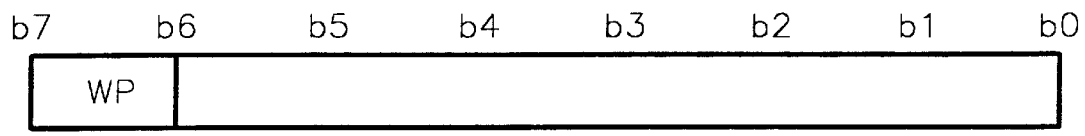
FIG. 9 shows the data structure of the write protection information stored in the disc identification zone of FIG. 8.

The write protection flag of the disc identification information corresponds to the most significant bit (MSB) of the first byte as shown in FIG. 9. When the flag (indicated by "WP") value is 1b (binary), it means that the entire area of the disc is write protected except for the disc identification zone and the drive test zone. Also, when the flag value is 0b, it means that the entire area of disc is rewritable. That is, "WP" of FIG. 9 is defined as follows.

WP=1b: Entire area of disc is write protected except for Drive test zone and Disc identification zone.

=0b: Entire area of disc is not write inhibited

The reason why only two normal flags are read from the four written write protection flags is as follows. In the case where only one write protection flag is written, an error can be generated in the area in which the corresponding flag is written, so that the area cannot be used. Also, in the case where only reading and not writing is allowed, there is a possibility of abnormal operation such that no information can be written to the disc permanently by erroneously reading the corresponding flag.

Meanwhile, when writing write protection information in a plurality of locations, there is a problem in that the time required for reading the corresponding information gets longer. That is, the time required for a series of processes from the insertion of a disc, including reading various information from the disc and recognizing the information required for the control of the disc by a microcontroller, can be become longer.

However, in the case of updating the write protection information, an operation only for the updating is performed. That is, because information is not read, the writing time in units of several hundreds milliseconds is barely worth consideration. Thus, writing is performed in four locations in consideration of the robustness of information, and error correction capability is taken into account during the recording. That is, if two errors are not generated, or normally corrected flags are read and two of them match each other, the write protection state of the disc is set without reading the remaining flags, thereby increasing the operating speed.

The write protection method suggested above is not limited to only the DVD-RAM, and can be applied to a disc that has specifications physically the same as DVD-R/RW and similar to the DVD specifications, which will now be described.

Figure 10:
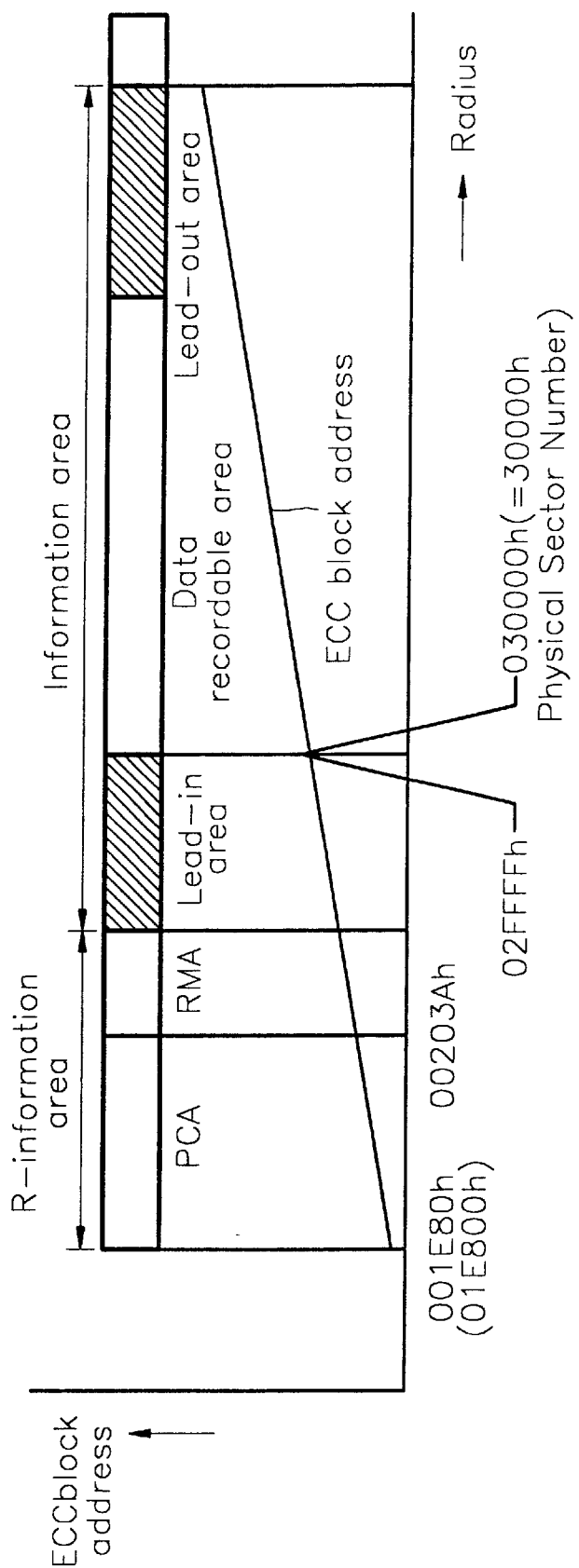
FIG. 10 shows the structure of a disc satisfying general DVD-R and DVD-RW specifications.

FIG. 10 shows the structure of a disc according to general DVD-R and DVD-RW specifications. The disc is roughly divided into two parts with respect to functionality, including an R (Recording)-information area and an information area. The R-information area is divided into a PCA (Power Calibration Area) for calibrating power, and an RMA (Recording Management Area) including general information relating to recording, i.e., information about the recording mode of a disc, recording state, optimal power control and border zone, and the information area is divided into a Lead-in area, data recordable area in which data is recordable by a user and a Lead-out area that is not defined yet in the DVD-R and DVD-RW specifications.

Figure 11:
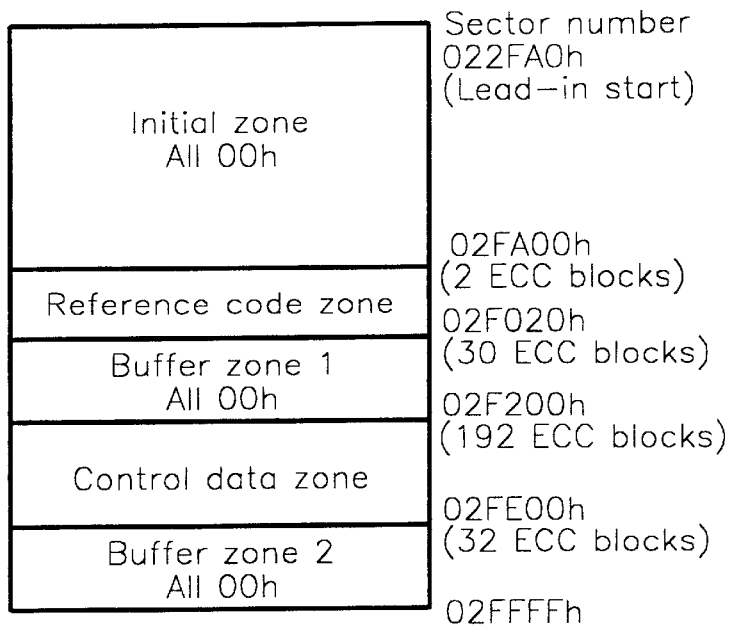
FIG. 11 shows the structure of a Lead-in area shown in FIG. 10.
Figure 12:
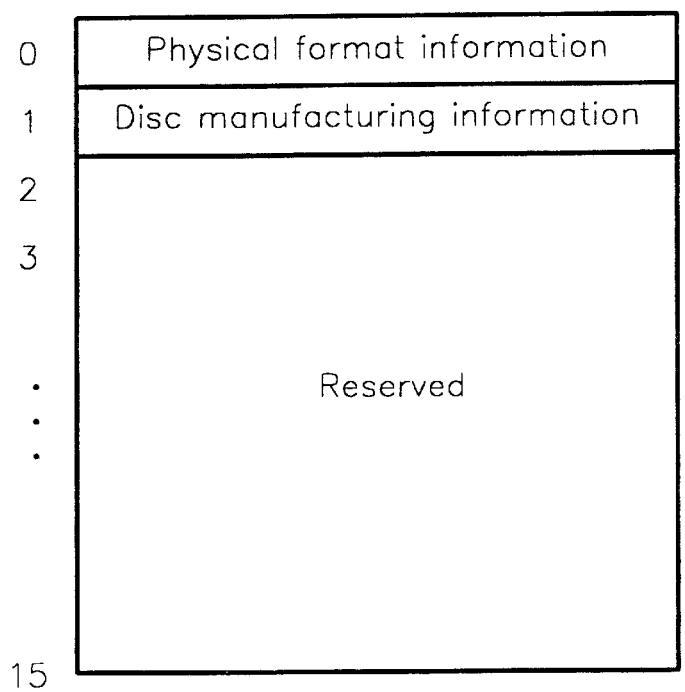
FIG. 12 shows the structure of a control data zone shown in FIG. 11.

Here, as shown in FIG. 11, the Lead-in area comprises an Initial zone (contents: 00h) for which a specific purpose is not defined, a reference code zone (channel bit pattern: 3T-6T-7T) used to control an equalizer for a radio frequency signal in a drive, first and second buffer zones (contents: 00h) and a control data zone containing the contents shown in FIG. 12.

In FIG. 12, physical format information of the control data zone is about types and versions of the specifications, disc size, maximum transmission rate, disc structure (single/dual), recording density and data region allocation, and the disc manufacturing information is unrelated to compatibility.

FIG. 13 shows the content of an RMD (Recording Management Data) field of the RMA according to the DVD-R and DVD-RW specifications. The RMA comprises an RMA Lead-in area including a system reserved field (contents: 00h) and a unique ID field, and RMD fields. As shown in FIG. 13, one RMD block consists of 16 sectors (15 RMD fields), in which the first sector is allocated as a linking-loss area, general information of the disc is stored in RMD field 0, Optimum Power Control (OPC) related information is stored in RMD field 1, user specific data (contents: 00h) is stored in RMD field 2, and border zone information is stored in RMD field 3. Also, in the case of a DVD-R disc according to the specifications of version 1.9, Rzone (Recording Zone) information including recording items is stored in RMD field 4 through RMD field 12 whenever the recording is performed, and RMD field 13 and RMD field 14 are reserved. Five identical copies of the RMD block are made.

In the case of a rewritable and erasable DVD-RW disc the specifications of which are not yet defined, Rzone information is stored in RMD field 4, and RMD field 5 through RMD field 12 are allocated to store defect management & certification related information taking reliability, certification before the disc is used and management of defect in use into consideration. Also, RMD field 13 and RMD field 14 are reserved.

FIG. 14 shows the contents of the general information of a disc stored in the RMD field 0 of FIG. 13. In FIG. 14, byte positions BP0 and BP1 store information about RMD format (recorded only with 0001h), byte position BP2 stores information about the disc status, and byte position BP3 is reserved. The byte positions BP4 through BP21 store unique disc identifier information that stores the recording date and time of the data as ASCII code. Pre-pit information is copied over the byte positions BP22 through BP85, and the remaining byte positions BP86 through BP2047 are reserved. Here, in the DVD-R disc, the disc status information stored in the byte position BP2 is defined as follows.

(BP2) Disc status
   00b: Indicates that disc is empty
   01b: Indicates that disc is in Disc-at-once recording mode
   02b: Indicates that disc is in incremental recording mode
   03b: Indicates that disc is finalized where incremental recording is used
   Others: Reserved FIG. 15 is an example of a table showing the state where the write protection information is stored on the disc adopting the DVD-R and DVD-RW specifications according to the present invention using the general information of a disc stored in RMD field 0 of FIG. 13.

That is, by defining the following using the reserved byte position BP3 of RMD field 0, information that the current disc is write protected can be transmitted to a drive.

(BP3) Disc write protection flag
   00b: Indicates that disc is not write protected
   01b: Indicates that disc is write protected (hard)
   02b: Indicates that disc is write protected (soft) Entire disc shall not be written to except for PCA, etc.

In the write protection information according to the present invention, 00b indicates that the disc is not write protected, 01b indicates that the entire disc is write protected (hard write protection), and 02b indicates that the entire disc except for a part of the disc (e.g., the PCA) is write protected (soft write protection). In the present embodiment, the write-protection information indicates that the entire disc is write protected or is not write protected. However, the RMD field of FIG. 13 is written connected to the previous data whenever new data is written, so that the write-protection can be set for only the written data corresponding to the RMD.

For example, even though write protection information is stored in the byte position BP3 of RMD field 0, the write protection information on a bare disc can be written using the Lead-in area and the Lead-out area shown in FIG. 10 in addition to the RMD area. Also, the byte position BP2 of RMD field 0 stores the disc status information, so that write protection information can be stored in the byte position BP2 of RMD field 0.

Since the write protection information cannot be updated in the once-writable DVD-R, in consideration of the consistency with the DVD family, write protection information can be indicated through finalization that means the writing on the defined Lead-in area and Lead-out area. "Finalization" means the completion of writing in the Lead-in area and the Lead-out area as well as in the user data area, of a once-writable DVD-R disc. That is, that the finalization has been performed (completed) indicates the DVD-R is write-protected. Otherwise, it means that there is no write protection.

Also, as in the defect management area DMA 1, DMA 2, DMA 3 and DMA 4 of the DVD-RAM, the same content is recorded multiple times to cope with errors, thereby ensuring robustness. In the DVD-R/RW, such robustness is ensured by grouping RMDs of the RMA and providing the RMDs belonging to one group with the same content.

A disc must include format information informing whether the current disc is a DVD-R or a DVD-RW, such that a DVD-R disc and a DVD-RW disc is compatible in the same drive. As shown in FIG. 15, the RMD format can be defined using the byte positions BP0 and BP1 of RMD field 0 as follows.

Figure 16:
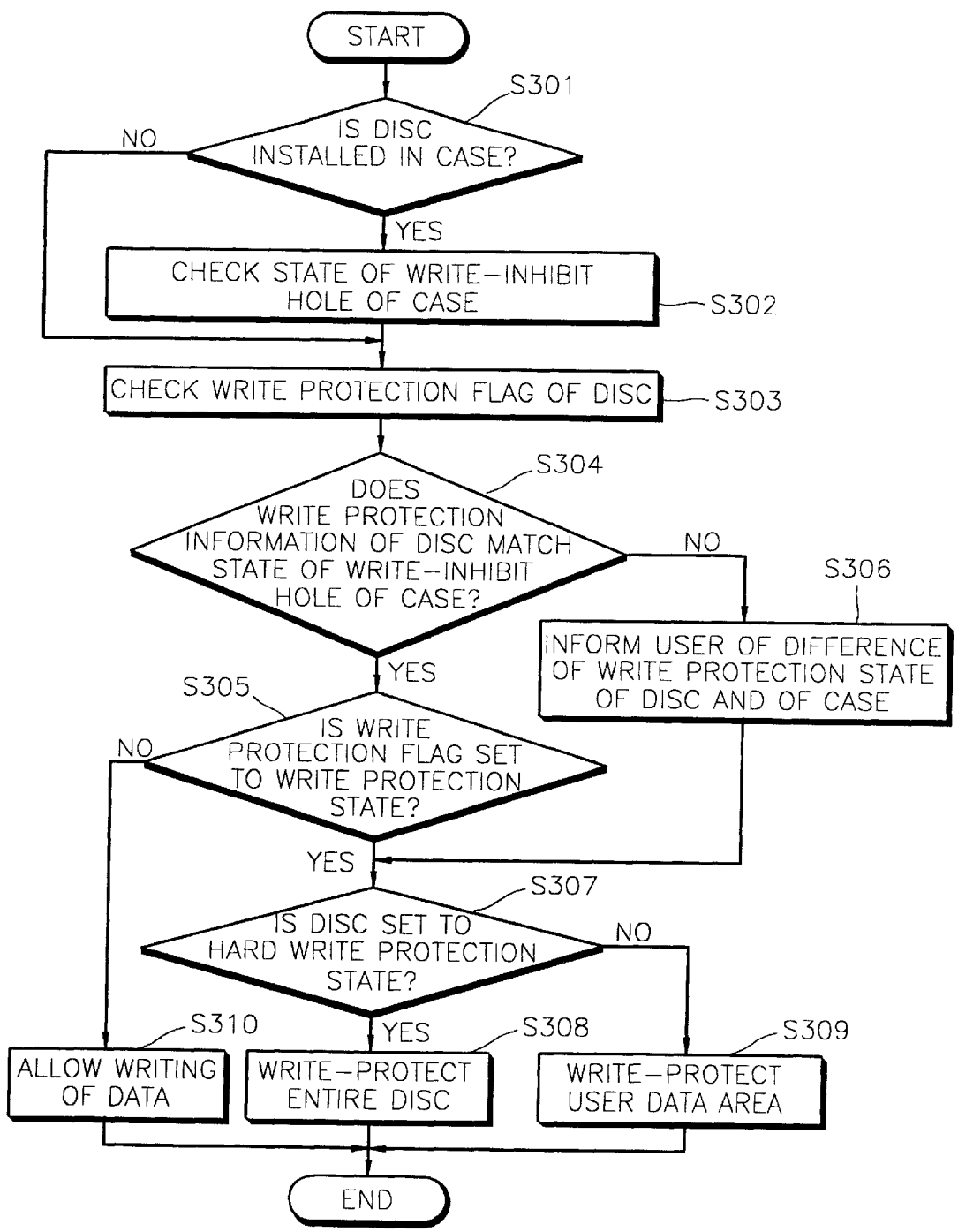
FIG. 16 is a flowchart illustrating a write protection method according to a second embodiment of the present invention.

(BP 0,1) RMD format
   0001h for R
   0002h for RW
   0003h for R/RW compatible mode FIG. 16 is a flowchart illustrating a write protection method according to a second embodiment of the present invention, in consideration of application extension to a DVD-RW contained in a case.

First, it is determined whether a disc is installed in a case (step S301). If the disc is installed in the case, the state of a write-inhibit hole of the case is checked (step 302). That is, if the write-inhibit hole is closed, it means that cartridge is not write protected, and if the write-inhibit hole is open, it means that the cartridge is write protected.

When the disc is not installed in the case in step S301, or when the state of the write-inhibit hole is checked in step S302, the write-protection flag of the disc is checked (step S303). That is, a write protection flag within RMD field 0 is checked.

Then, it is determined whether the write protection information of the disc matches the state of the write-inhibit hole of the case (step S304). That is, when the write protection information is written on the disc and the write-inhibit hole of the case is opened, it is determined that the write protection flag is in a "write protection" state (step S305). Otherwise, the user is informed that the write protection information of the disc does not match the state of the write-inhibit hole of the case (step S306).

If the write protection flag of the disc is set to the "write protection" state in step S305, or after the step 306, that is, if either the disc or the case is in a "write protection" state even though the write protection information of the disc does not match the state of the write-inhibit hole of the case, it is determined whether the disc is set to the "hard write protection" state (step S307). If the disc is in the "hard write protection" state, the entire disc including the user data area is write-prohibited (step S308). Otherwise, only the user data area is write protected (step S309). Also, in the step S305 if the write protection flag is not in the "write protection" state, the disc is not write-protected (step S310).

In a recordable and/or rewritable medium according to the present invention, e.g., a disc satisfying the DVD specifications, e.g., DVD-RAM, DVD-R and DVD-RW, data of a bare disc that is not contained in a case can be efficiently protected. Also, when either the case or the disc is in the write protection state, the writing of data is prohibited and the user is allowed to check the state of a disc or a cartridge. As a result, the data recorded on the disc can be protected efficiently from unwanted overwriting or erasing.

What is claimed is:

1. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:
   checking write protection information stored in a disc identification zone of the recording medium, with the disc identification zone structure complying with a DVD specification; and
   prohibiting writing of data on the recording medium according to a matching of at least two write protection information, read without error from the recording medium, stored on the recording medium at the same time.

2. The write protection method of claim 1, further comprising:
  determining whether the write protection information is soft write protection information; and
  prohibiting writing of data on the entire recording medium except for a designated part of the recording medium if the write protection information is the soft write protection information, and otherwise allowing the writing of the data in the user data area.

3. The write protection method of claim 1, further comprising:
  determining whether the write protection information is for a specific region of the user data area; and
  prohibiting the writing of data in the specific area of the user data area if the write protection information is for the specific area, and otherwise allowing the writing of the data in the entire user data area.

4. The write protection method of claim 1, further comprising:
  determining whether the recording medium is installed in a case;
  if the recording medium is installed in the case, checking whether the case is set to a write protection state; and
  if the write protection information of the recording medium does not match the write protection state of the case, informing a user of the difference.

5. The write protection method of claim 4, further comprising:
  prohibiting the writing of the data on the recording medium if the write protection information of the recording medium or the write protection state of the case is set to the write protection state.

6. The write protection method of claim 1, further comprising:
  checking a write protection state set in the recording medium using the write protection information; and
  updating the write protection information stored in the recording medium to the write protection state or a write protection release state according to the write protection information set by a user.

7. The write protection method of claim 6, further comprising:
  if the write protection information of the recording medium, set by the user, and the write protection state of a case, where the recording medium is stalled, do not match, informing the user of the difference.

8. The write protection method of claim 1, wherein the write-protection information is stored in at least one of a Lead-in area and a Lead-out area of the recording medium.

9. The write protection method of claim 1, wherein the recording medium is a recordable and reproducible recording medium satisfying a DVD-RAM, DVD-RW or DVD-R specification.

10. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:
  checking write protection information stored on the recording medium;
  prohibiting writing of data on the recording medium according to a matching of at least two write protection information, read without error from the recording medium, stored on the recording medium at the same time;
  determining whether the write protection information is hard write protection information; and
  prohibiting writing of data on the entire recording medium if the write protection information is the hard write protection information, and otherwise allowing the writing of the data in only the user data area.

11. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:
  checking write protection information stored on the recording medium;
  prohibiting writing of data on the recording medium according to the write protection information;
  checking a write protection state set in the recording medium using the write protection information; and
  updating the write protection information stored in the recording medium to the write protection state or a write protection release state according to the write protection information set by a user, such that if the user sets the write protection state, the write protection information is updated to the write protection state, and if the user sets the write protection release state, it is determined whether the recording medium is set to a hard write protection state, and if the recording medium is set to the hard write protection state, the user is informed that a releasing of the write protection is impossible, and otherwise the write protection information is updated to the write protection release state.

12. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:
  checking write protection information stored on the recording medium; and
  prohibiting writing of data on the recording medium according to the write protection information,
  wherein the write protection information is stored, at the same time, in disc identification zones of at least one of the Lead-in area and the Lead-out area of the recording medium, the write protection information is stored in a plurality of physically separate locations of each of the at least one disc identification zone, and a write protection state of the write protection information is set according to a matching of at least two write protection information, read without error from the recording medium.

13. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:
  checking write protection information stored on the recording medium; and
  prohibiting writing of data on the recording medium according to the write protection information,
  wherein the write protection information is stored in at least one of a defect management area of the Lead-in area and the defect management area of the Lead-out area of the recording medium.

14. A write protection method for an optical disc recording and/or reproducing apparatus which records and/or reproduces data on/from a recording medium positioned in a case of a cartridge, wherein the recording medium includes a user data area to store the data and redundantly stored write protection information, stored at the same time, indicative of whether to prevent writing of new data on the recording medium, and the case has a write inhibit hole for write protection, the method comprising:

determining whether a write protection state of the redundantly stored write protection information matches the write protection state of the write inhibit hole, wherein the write protection state of the redundantly stored write protection information is determined according to at least two write protection information, read without error from the recording medium, matching; and preventing writing of the new data on the recording medium if the write protection information or the write inhibit hole indicates the write protection state to be that of preventing the writing of the new data on the recording medium.

15. The write protection method of claim 14, further comprising:

informing a user if the write protection states of the write protection information and the write inhibit hole do not match.

16. A write protection method for an optical disc recording and/or reproducing apparatus which records and/or reproduces data on/from a recording medium positioned in a case of a cartridge, wherein the recording medium includes a user data area to store the data and write protection information indicative of whether to prevent writing of new data on the recording medium, and the case has a write inhibit hole for write protection, the method comprising:

determining whether a write protection state of the write protection information matches the write protection state of the write inhibit hole;

preventing writing of the new data on the recording medium if the write protection information or the write inhibit hole indicates the write protection state to be that of preventing the writing of the new data on the recording medium;

determining whether the write protection information is set to a write protection state;

determining whether the write protection information is set for a hard write protection state indicating that the write protection state can not be restored to a rewritable state, if the write protection information is set to the write protection state;

preventing writing of the new data on the entire recording medium if the write protection information is set for the hard write protection and preventing writing of the new data only in the user data area if the write protection information is not set for the hard write protection; and enabling writing of the new data on any location of the recording medium if the write protection information is not set to the write protection state.

17. A write protection method for an optical disc recording and/or reproducing apparatus which records and/or reproduces data on/from a recording medium positioned in a case of a cartridge, wherein the recording medium includes a user data area to store the data and write protection information indicative of whether to prevent writing of new data on the recording medium, and the case has a write inhibit hole for write protection, wherein the write protection information is stored in a disc certification flag and a group certification flag of the recording medium, the method comprising:

determining whether a write protection state of the write protection information matches the write protection state of the write inhibit hole;

preventing writing of the new data on the recording medium if the write protection information or the write inhibit hole indicates the write protection state to be that of preventing the writing of the new data on the recording medium;

determining whether the write protection information of the disc certification flag is set to a write protection state;

determining whether the write protection information of the disc certification flag is set for a hard write protection state indicating that the write protection state can not be restored to a rewritable state, if the write protection information of the disc certification flag is set to the write protection state;

preventing writing of the new data on the entire recording medium if the write protection information of the disc certification flag is set for the hard write protection and preventing writing of the new data only in the user data area if the write protection information of the disc certification flag is not set for the hard write protection;

determining whether the write protection information of the group certification flag is set to the write protection state; and enabling writing of the new data on any location of the recording medium if the write protection information of the group certification flag is not set to the write protection state and preventing writing of the new data in the write protected group of the group certification flag if the write protection information of the group certification flag is set to the write protection state.

18. A write protection method for an optical disc recording and/or reproducing apparatus which records and/or reproduces data on/from a recording medium positioned in a case of a cartridge, wherein the recording medium includes a user data area to store the data and write protection information indicative of whether to prevent writing of new data on the recording medium, and the case has a write inhibit hole for write protection, the method comprising:

determining whether a user inputs new write protection information to optical disc recording and/or reproducing apparatus;

determining whether the new write protection information is set for a write protection state;

setting the write protection information on the recording medium to the write protection state of the new write protection information if the new write protection information is set to the write protection state;

determining whether the new write protection information is set to a write protection release state if the new write protection information is not set to the write protection state;

determining whether the write protection information stored on the recording medium is set to a hard write protection state indicating that the write protection state can not be restored to a rewritable state, if the write protection information stored on the recording medium is set to the hard protection state; and changing the write protection information stored on the recording medium to the rewritable state if the write protection information is not set to the hard write protection state, and informing the user that the write protection state of the write protection information cannot be released if the write protection information is set to the hard write protection state.

19. A write protection method for an optical disc recording and/or reproducing apparatus, wherein data recorded on a recordable and/or reproducible recording medium including a Lead-in area, a Lead-out area and a user area protected from unwanted overwriting or erasing based upon redundantly stored write protection information data, the method comprising:

reading at least two redundantly stored write protection information data from the recordable and/or reproducible recording medium; and determining whether the recordable and/or reproducible recording medium is set to a write protection state or a non-write protection state based upon whether the at least two redundantly stored write protection information data match.

20. The write protection method of claim 19, wherein when the recordable and/or reproducible recording medium is set to a write protection state if the at least two redundantly stored write protection information data match, additional write protection information data is not read to verify the write protection state determination.

21. The write protection method of claim 19, wherein the recordable and/or reproducible recording medium meets a DVD specification.

22. A write protection method for an optical disc recording and/or reproducing apparatus, wherein data recorded on a recordable and/or reproducible recording medium including a Lead-in area, a Lead-out area and a user area protected from unwanted overwriting or erasing based upon redundantly stored write protection information data, the method comprising:

reading at least two redundantly stored write protection information data from the recordable and/or reproducible recording medium; and determining whether the recordable and/or reproducible recording medium is set to a non-write protection state based upon whether the at least two redundantly stored write protection information data represent errors.

23. The write protection method of claim 22, wherein the recordable and/or reproducible recording medium meets a DVD specification.

24. A write protection method for an optical disc recording and/or reproducing apparatus, wherein data recorded on a recordable and/or reproducible recording medium including a Lead-in area, a Lead-out area and a user data area is protected from unwanted overwriting or erasing, the method comprising:

checking write protection information stored, at the same time, in a defect management area of the recording medium; and prohibiting writing of data on the recording medium according to the write protection information, wherein a write protection state of the write protection information is determined according to at least two write protection information, read without error from the recording medium, matching.

25. The write protection method of claim 24, further comprising:

determining whether the write protection information is soft write protection information; and prohibiting writing of data on the entire recording medium except for a designated part of the recording medium if the write protection information is the soft write protection information, and otherwise allowing the writing of the data in the user data area.

26. The write protection method of claim 24, her comprising:

determining whether the write protection information is for a specific region of the user data area; and prohibiting the writing of data in the specific area of the user data area if the write protection information is for the specific area, and otherwise allowing the writing of the data in the entire user data area.

27. The write protection method of claim 24, further comprising:

determining whether the recording medium is installed in a case;

if the recording medium is installed in the case, checking whether the case is set to a write protection state; and if the write protection information does not match the write protection state of the case, informing a user of the difference.

28. The write protection method of claim 27, further comprising:

prohibiting the writing of the data on the recording medium if the write protection information of the recording medium or the write protection state of the case is set to the write protection state.

29. The write protection method of claim 24, further comprising:

checking a write protection state set in the recording medium using the write protection information; and updating the write protection information stored in the recording medium to the write protection state or a write protection release state according to the write protection information set by a user.

30. The write protection method of claim 29, further comprising:

if the write protection information of the recording medium, set by the user, and the write protection state of the case do not match, informing the user of the difference.

31. The write protection method of claim 24, wherein the write-protection information is stored in at least one of a Lead-in area and a Lead-out area of the recording medium.

32. A write protection method for an optical disc recording an/or reproducing apparatus, wherein data recorded on a recordable and/or reproducible recording medium including a Lead-in area, a Lead-out area, and a user data area is protected from unwanted overwriting or erasing, the method comprising:

checking write protection information stored, at the same time, in the recording medium; and prohibiting writing of data on the recording medium according to the write protection information, wherein the recording medium stores the write protection information to protect the data recorded on the recording medium from unwanted overwriting or erasing, with the write protection information being stored redundantly in a plurality of locations in the Lead-in area of the recording medium, and a write protection state of the redundantly stored write protection information being determined according to at least two write protection information, read without error from the recording medium, matching.

33. The write protection method of claim 32, wherein at least one of the redundantly stored write protection information is stored in a zone of the Lead-in area specified as an unused zone according to a DVD specification.

34. The write protection method of claim 33, wherein the unused zone is a disc identification zone.

35. The write protection method of claim 32, further comprising comparing the redundantly stored write protection information for a mismatch, and informing a user if a mismatch is detected.

36. The write protection method of claim 32, further comprising:

determining whether the recording medium is installed in a case;

if the recording medium is installed in the case, checking whether the case is set to a write protection state; and if a write protection state of the case does not match a write protection state of the recording medium, informing a user of the difference, wherein the write protection state of the recording medium is based on the write protection information.

37. The write protection method of claim 36, further comprising:

prohibiting the writing of the data on the recording medium if the write protection state of the recording medium or the write protection state of the case is set to a write protection state.

38. The write protection method of claim 32, further comprising:

determining whether the write protection information is hard write protection information; and prohibiting writing of data on the entire recording medium if the write protection information is the hard write protection information, and otherwise allowing the writing of the data in only the user data area.

39. The write protection method of claim 32, further comprising:

determining whether the write protection information is soft write protection information; and permitting writing of data on the entire recording medium except for at least one designated part of the recording medium if the write protection information is the soft write protection information.

40. The write protection method of claim 32, wherein the recording medium is a recordable and reproducible recording medium satisfying a DVD-RAM, DVD-RW or DVD-R specification.

* * * * *

UNITED STATES PATENT AND TRADEMARK OFFICE
CERTIFICATE OF CORRECTION

PATENT NO. : 6,744,713 B1
DATED : June 1, 2004
INVENTOR(S) : Jung-wan Ko et al.

It is certified that error appears in the above-identified patent and that said Letters Patent is hereby corrected as shown below:

Title page,
Item [56], References cited, Foreign Patent Documents, please insert:
-- Foreign Patent Documents
5-151707     6/1993  Japan OTHER PUBLICATIONS
JIS 120 mm DVD-DVD-RAM, JIS X 6243, January 10, 2000
English Language Japanese Office Action for Japanese Divisional Patent Application No. 2000-319954, dated January 6, 2004 (related to the present Application) --

Signed and Sealed this

Nineteenth Day of October, 2004

JON W. DUDAS
*Director of the United States Patent and Trademark Office*